(No Model.) 6 Sheets—Sheet 1.

F. SAUNIER.
CAN CAPPING MACHINE.

No. 445,477. Patented Jan. 27, 1891.

WITNESSES:
INVENTOR: F. Saunier
BY Munn & Co.
ATTORNEYS

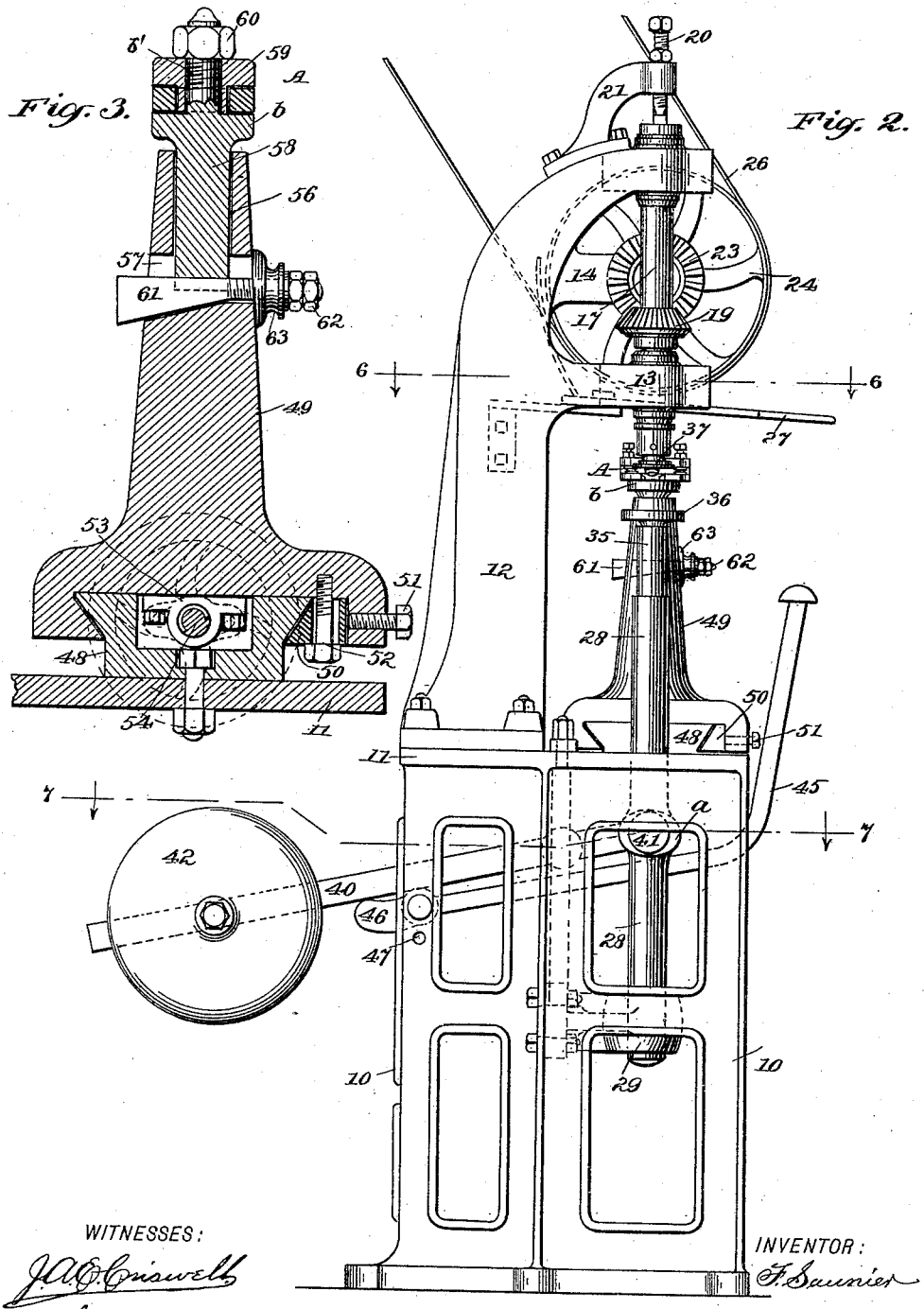

(No Model.)  6 Sheets—Sheet 3.

F. SAUNIER.
CAN CAPPING MACHINE.

No. 445,477.  Patented Jan. 27, 1891.

WITNESSES:  INVENTOR:
  F. Saunier
BY
  Munn & Co.
  ATTORNEYS (No Model.) 6 Sheets—Sheet 4.
F. SAUNIER.
CAN CAPPING MACHINE.
No. 445,477. Patented Jan. 27, 1891.
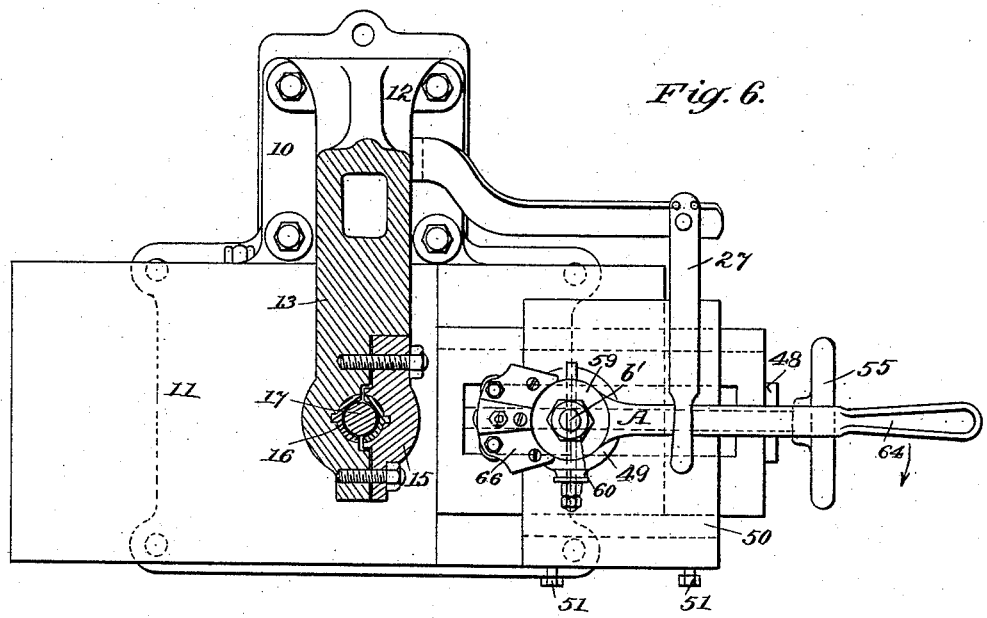
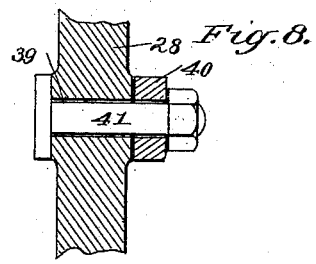
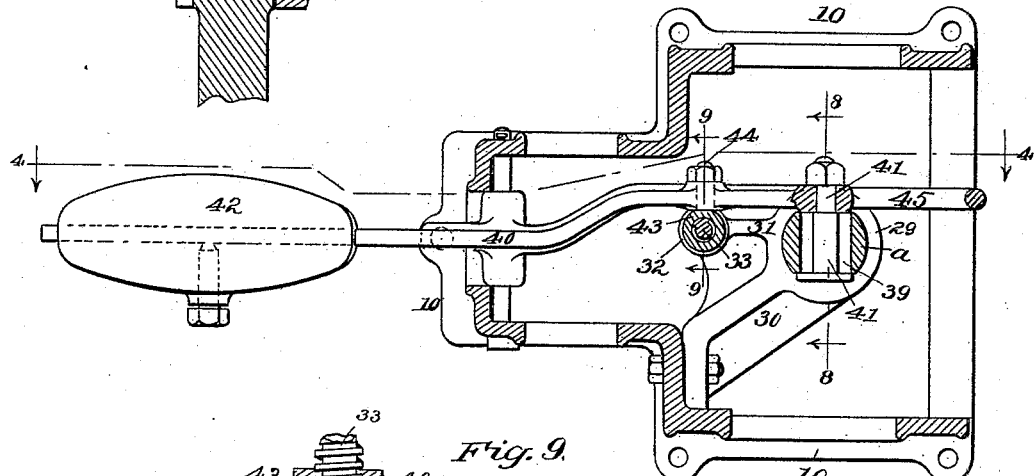
WITNESSES:
INVENTOR:
F. Saunier
BY
Munn & Co.
ATTORNEYS (No Model.) 6 Sheets—Sheet 5.

F. SAUNIER.
CAN CAPPING MACHINE.

No. 445,477. Patented Jan. 27, 1891.

WITNESSES:
J. C. Criswell
C. Sedgwick

INVENTOR:
F. Saunier
BY
Munn & Co.
ATTORNEYS

THE NORRIS PETERS CO., PHOTO-LITHO., WASHINGTON, D. C.

(No Model.)
F. SAUNIER.
CAN CAPPING MACHINE.
No. 445,477.
6 Sheets—Sheet 6.
Patented Jan. 27, 1891.
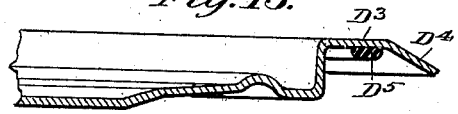
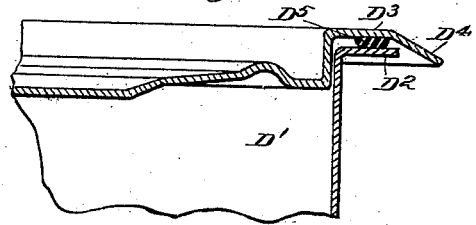
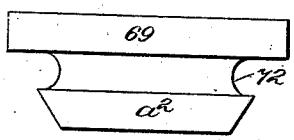
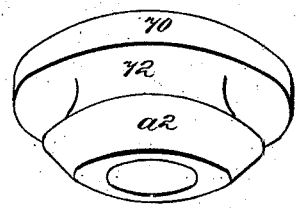
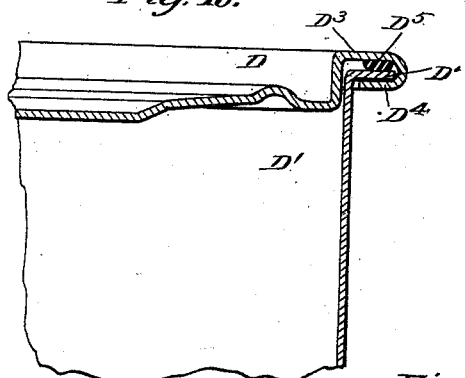
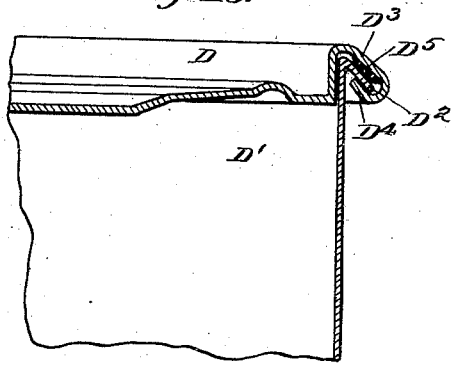
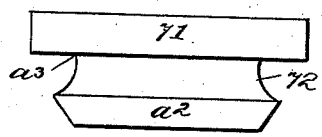
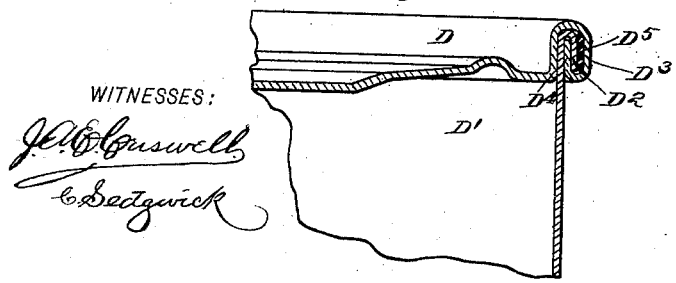
WITNESSES:
INVENTOR:
F. Saunier
BY
Munn & Co.
ATTORNEYS

UNITED STATES PATENT OFFICE.

FERNAND SAUNIER, OF NANTES, FRANCE, ASSIGNOR TO REISS & BRADY, OF NEW YORK, N. Y.

CAN-CAPPING MACHINE.

SPECIFICATION forming part of Letters Patent No. 445,477, dated January 27, 1891.

Application filed June 7, 1890. Serial No. 354,558. (No model.) Patented in France March 24, 1888, No. 189,570.

*To all whom it may concern:*

Be it known that I, FERNAND SAUNIER, a citizen of the Republic of France, residing at Nantes, Department of Loire-Inférieure, France, have invented a new and useful Improvement in Can-Capping Machines, (which has been patented to me in France, March 24, 1888, No. 189,570,) of which the following is a full, clear, and exact description.

My invention relates to an improvement in can-capping machines, and has for its object to provide a means whereby the caps of cans may be expeditiously attached to the body without the use of solder or its equivalent, and wherein when the caps have been secured to the body a perfectly air-tight connection will be effected.

A further object of the invention is to provide a machine capable of accomplishing the above results, which will be compact, of simple construction, and economic in operation and cost.

The invention consists in the novel construction and combination of the several parts, as will be hereinafter fully set forth, and pointed out in the claims.

Reference is to be had to the accompanying drawings, forming a part of this specification, in which similar letters and figures of reference indicate corresponding parts in all the views.

Figure 1:
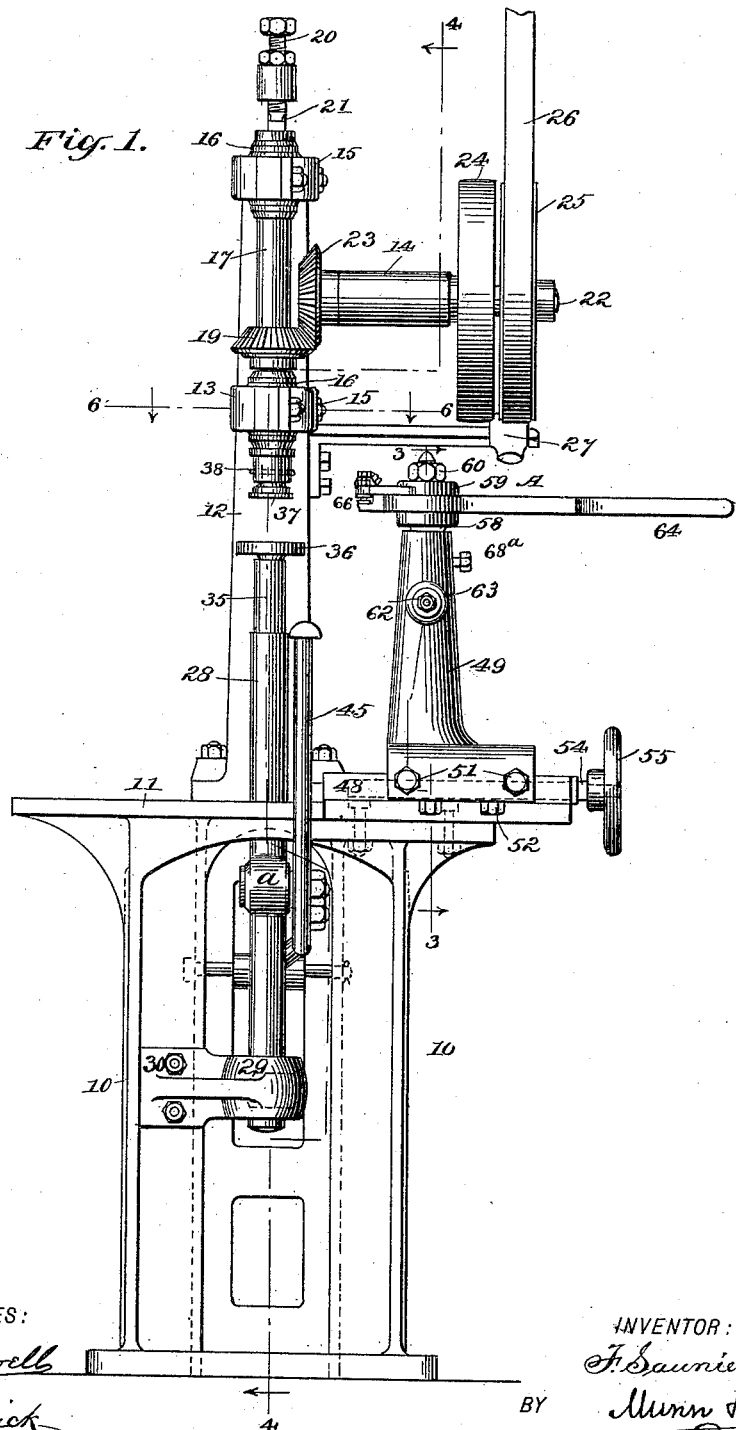
Figures 4, 5:
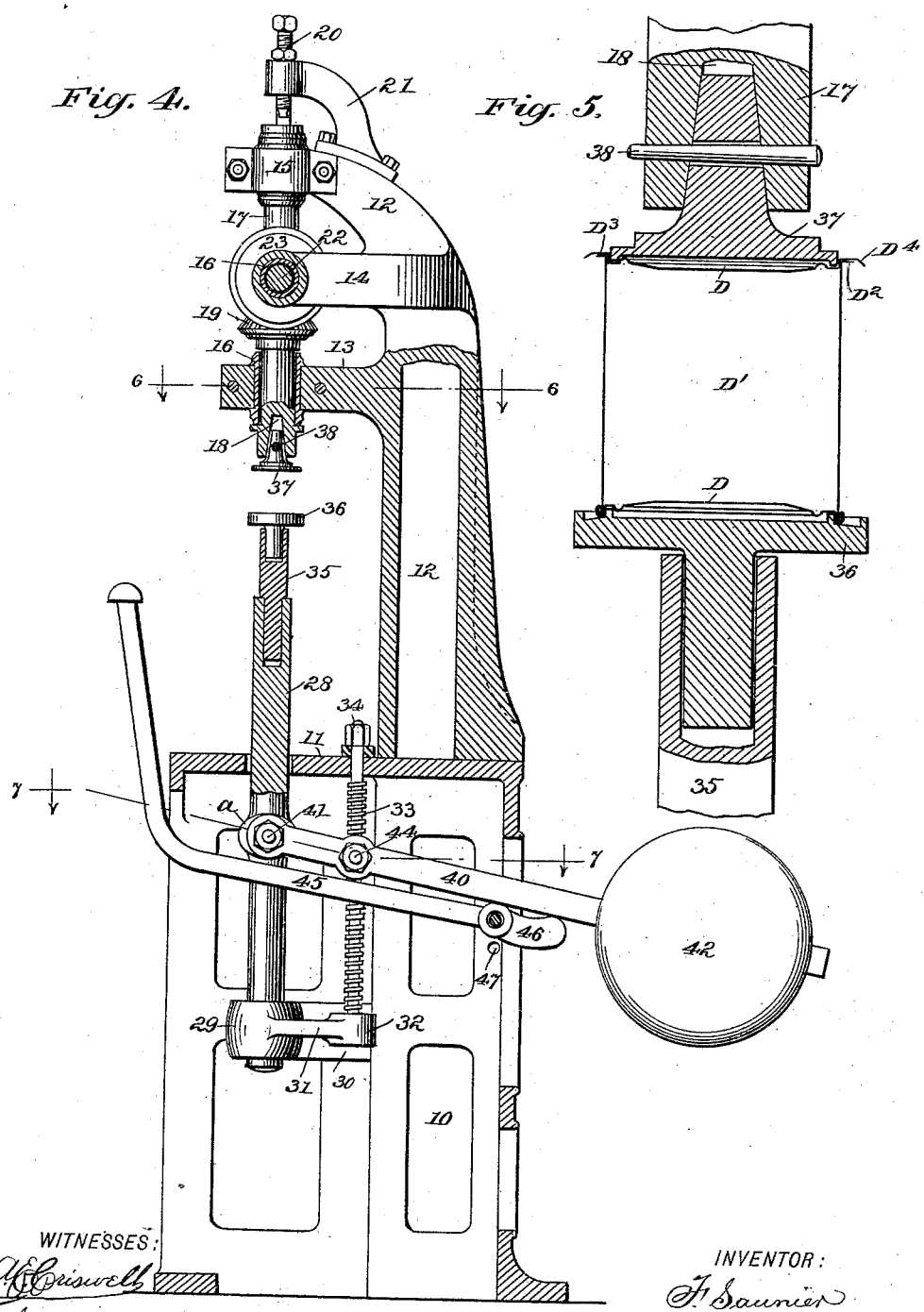
Figure 10:
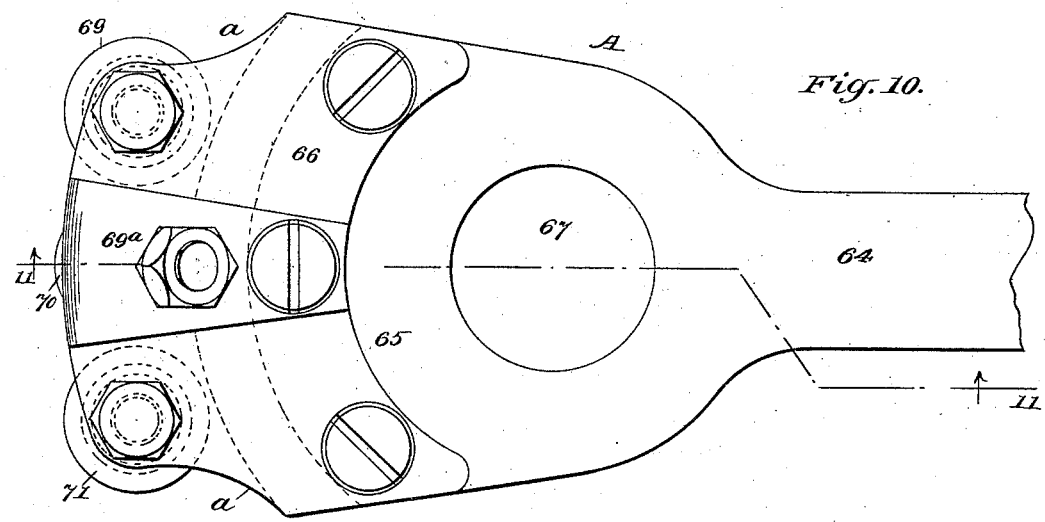
Figure 11:
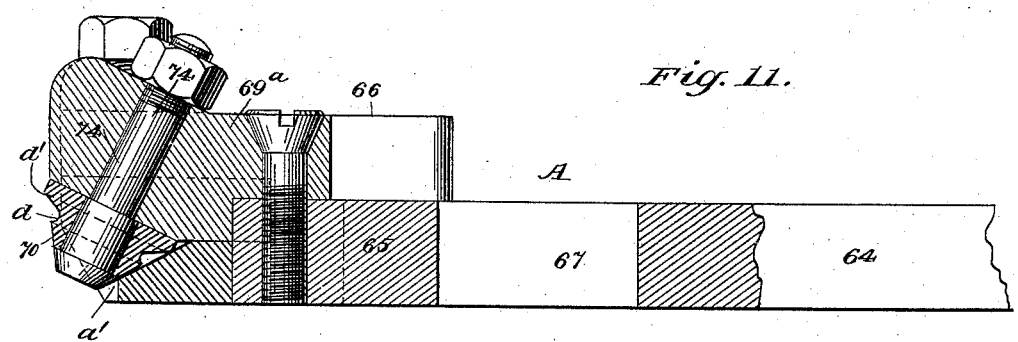
Figure 12:
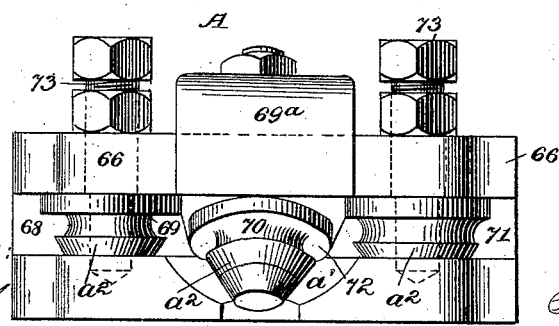

Figure 1 is a front elevation of the machine. Fig. 2 is a side elevation. Fig. 3 is a section on line 3 3 of Fig. 1. Fig. 4 is a vertical section taken on line 4 4 of Figs. 1 and 7. Fig. 5 is an enlarged vertical section through the supporting and clamping disks and a can held between them. Fig. 6 is a horizontal section on line 6 6 of Figs. 1, 2, and 4. Fig. 7 is a horizontal section on lines 7 7 of Figs. 2 and 4. Fig. 8 is a detail sectional view taken on lines 8 8 of Fig. 7. Fig. 9 is another detail sectional view taken on lines 9 9 of Fig. 7. Fig. 10 is a plan view of the capping-arm employed in connection with the machine. Fig. 11 is a longitudinal section through said arm, taken on line 11 11 of Fig. 10, and Fig. 12 is a front elevation of said arm. Fig. 13 is a partial diametrical section of a can-cap ready to be placed upon the can-body. Fig. 14 is a similar section to Fig. 13, illustrating the can-cap as placed upon the body of the can. Fig. 15 is a side elevation of the first forming or shaping roll, and Fig. 16 is a sectional view through a can body and cap, illustrating the formation of the can-cap produced by contact with the first roll. Fig. 17 is a perspective view of the second shaping or forming roll, and Fig. 18 is a sectional view of a can body and cap, illustrating the formation of the latter as produced by the second roll. Fig. 19 is a side elevation of the third shaping or forming roll; and Fig. 20 illustrates the complete capping of the can as produced by the said third roll.

The base 10 of the machine is preferably made in skeleton form, open at the front and essentially rectangular in cross-section, as best shown in Fig. 7, and to economize in metal from a point near the center at the rear the frame is reduced in width, and the upper portion of the frame is provided with a top or table 11. Upon the table 11, at the rear reduced portion, a standard 12 is bolted or otherwise secured, which standard is curved at its top in the direction of its front; and at the front edge below the top a horizontal forwardly-extending arm 13 is formed, and a second arm 14 is cast at one side of the standard, which is outwardly and forwardly bent, the location of the latter arm being about midway between the top and the lower arm 13 of the standard, as best shown in Figs. 1, 2, and 4. The upper overhanging end of the standard, and likewise the lower arm 13, are provided with a vertical bore and a recess at one side, into which a block 15 is fitted, bored to register with the body-bore, and as illustrated in Fig. 6. The blocks, which serve as one section of journal-boxes, are bolted to the arm and standard. The registering-bore of the blocks and the bores in the bodies to which they are attached form circular openings, into which a bearing-box 16 of any approved construction is inserted.

In the boxes of the arm 13 and the box of the standard a perpendicular shaft 17 is journaled, provided at its lower end with a tapering bore or socket 18, and above the arm 13 with an attached miter-gear 19. The shaft is prevented from working upward by reason of a set-screw 20, having a bearing upon its upper end, the said set-screw being held to turn in a bracket-arm 21 attached to the top of the standard.

The arm 14 of the standard, which is preferably provided with a detachable block similar to the arm 13, has a bearing-box 16, in which a horizontal shaft 22 is journaled, carrying at its inner end a miter-gear 23, which meshes with the gear 19 of the perpendicular shaft, and at its outer end a fast and a loose pulley 24 and 25. This horizontal shaft is the drive-shaft, and the driving-belt 26 is thrown from one pulley to the other by any approved form of shifting device 27.

Immediately beneath the perpendicular shaft 17 a rest-bar 28 is located, which extends vertically above and below the table 11, the lower end being guided by a sleeve 29 formed upon the horizontal end of a bracket 30, attached to the inner rear wall of the wider portion of the base, and carried diagonally to the center of said portion, as shown in Fig. 7, and the said sleeve is provided with a rearwardly-extending arm 31, as illustrated in said figure, at the end of which arm an enlargement 32 is formed, provided with a threaded bore. Into the threaded bore of the enlargement 32 the lower end of a screw 33 is entered, the upper end whereof, passing through the table, is preferably squared and surrounded by a washer having a bearing upon the upper surface of the table, and a lock-nut 34 is also provided at the upper end of the screw, as illustrated in Fig. 4.

The rest-bar is preferably made of iron, and a rectangular socket is usually formed in its upper end into which a brass extension 35 is entered, and in the upper end of said extension a circular bore is produced to receive the shank of a can-supporting disk 36, the said disk being adapted to freely revolve in its socket.

Above the can-supporting disk the conical shank of a can-clamping disk 37 is inserted in the socket 18 of the perpendicular shaft 17, the said disk being detachably held in its socket usually by a pin 38 passed through the shank and shaft, as illustrated in Figs. 4 and 5. The object of making the upper portion of the rest-bar of brass is to reduce the friction of the supporting-disk revolving therein to a minimum.

Below the table the rest-bar is provided with a transverse oval enlargement $a$, (see Fig. 4,) in which a transverse elongated opening 39 is produced of the same depth throughout, as shown in Fig. 8, and in this opening the forward end of a lifting-bar 40 is attached, the attachment being effected by means of a bolt 41, as shown in said Fig. 8, of a thickness equivalent to the depth of the opening 39, but of less width. The rear end of the lifting-bar has attached thereto a counterpoise-weight 42, of sufficient size to normally retain the rest-bar in its uppermost position, even when the can to be headed or capped is contained between the supporting and clamping disk.

An interiorly-threaded sleeve 43 is held to turn upon the stationary screw 33, which sleeve is formed at one side with a stem 44, threaded at its outer end, as shown in Fig. 9, and the said stem is passed through an aperture in the counterpoise lifting-bar, and a nut is screwed upon its outer extremity.

By reason of the peculiar attachment of the lifting-bar, by unscrewing the nuts upon the stem of the sleeve 43 and the bolt 41, the said sleeve 43 may be screwed upward or downward, and the position of the bolt 41 be shifted to change the fulcrum of the lifting-bar for the purpose of giving the rest-bar more or less throw, as may be required in treating cans of different heights. The lifting-bar is raised, and the rest-bar consequently lowered, by a lever 45, fulcrumed beneath the said lifting-bar at the rear of the base 10, the said lever being provided with a rear finger 46, adapted for contact with the lifting-bar, and the forward end of the lever is carried outward at the front of the base and thence upward beyond the table 11, as illustrated in Fig. 4. The fulcrum of the lever 45 may be changed to accommodate the change in the fulcrum of the lifting-bar by placing the pivotal pin of the lever in any one of a series of apertures 47 formed in the base.

At one side of the machine upon the table a dovetail rib 48 is formed, upon which rib the base of a post 49 is held to slide to and from the rest-bar, the said base having formed therein a dovetail recess of greater width than the dovetail rib. The object of making the recess larger is to admit of the introduction of a wedge-key 50, adjusted to and from the rib by set-screws 51 and held in connection with the post by retaining-screws 52, as shown in Fig. 3. The post may be slid upon the table in any approved manner, that shown consisting in channeling a portion of the rib, forming a lug 53 upon the base of the post, extending into said channel and provided with a threaded opening, and journaling a screw 54 in the rib, which passes through the opening in the lug, the said screw being fitted at one end with a hand-wheel 55. The object of the key is to take up any wear and tear that may occur at the base of the post. Upon the upper end of the post the shaping-arm A, or, more properly, tool, is pivoted, and to that end a vertical bore 56 is produced in the top of the post, intersected by a transverse opening 57, extending through from side to side, as shown in Fig. 3. Into the bore 56 a pivot pin or stud 58 is entered, which extends down into the transverse opening 57, the pin or stud being made widest at its upper end above the base, as shown at $b$, and through the center of the wide portion $b$ an integral bolt $b'$ is upwardly projected, adapted to receive a nut 59, having a downwardly-extending annular flange and also a lock-nut 60. The pin or stud is raised or lowered to provide for possible adjustment of the shaping arm or tool by a wedge 61 contacting with its lower end and resting upon the base-wall of the opening 57, which wall is beveled or inclined. The wedge is preferably manipulated through the medium of lock-nuts 62, bearing on a washer 63, located at the outer side of the post, the pin being held after adjustment by a set-screw 68$^a$.

The shaping arm or tool A consists of a handle 64, provided with a wide flat head 65 at one end, the front of which head is preferably convexed, as shown in dotted lines in Fig. 10. To the head a cap plate or block 66 is preferably attached, which plate or block extends over upon the upper face of the head and is bolted thereto, and the end rear edge of the block is recessed to snugly fit to the curved contour of the head, as shown in Fig. 11. The head is provided with a circular opening 67, to receive the bolt $b'$ of the stud 58, and the sides of the cap plate or block are concaved, as shown at $a$ in Fig. 10, while in the front at each side of the center a horizontal channel 68 is produced, and in the center a preferably angular recess is made, the base-wall of which recess at the front is concaved, as illustrated at $a'$ in Figs. 11 and 12. Into the central angular recess of the cap-block an auxiliary block 69$^a$ is inserted and bolted in any suitable manner, the outer faces of the main and auxiliary blocks being flush and convexed, as best shown in Fig. 10.

In the channel 68 three forming-rollers 69 70, and 71 are journaled, the rollers 69 and 71 being located near the ends of the channel 68 of the shaping tool or arm and the roller 70 at the center. The roller 69, which is illustrated in detail in Fig. 15, is provided with a central peripheral concave groove or channel 72, and the peripheral surface below said groove is beveled downward, as shown at $a^2$. The third roller 71 is practically similar in shape with the first roller 69. The top portion of the groove or channel, however, is essentially straight, as illustrated at $a^3$ in Fig. 19. The two outer rollers 69 and 71 are each provided with a vertical axis 73; but the axis 74 of the central roller 70 is inwardly inclined and the groove or channel 72 of this roller is of peculiar shape, the lower portion of the wall being decidedly concave, as shown at $d$, while the upper portion $d'$ is inclined upward upon practically a straight line. The rollers are arranged in the shaping tool or arm in a circle.

When the shaping-tool is placed upon the post 49, the bolt $b'$ of the head of the stud 58 is passed up through an opening 67 in the head of the tool, and the said tool is held to turn upon the head of the post. The walls of the opening 67 do not contact with the bolt $b'$, as the flange of the nut 59 is interposed between it and the bolt.

In operation, the cap or head D is seamed to the body D' of the can at one movement of the shaping tool or arm. The can is placed between the supporting-disk 36 and clamping-disk 37, and the perpendicular shaft 17 is set in motion, whereupon a rapid rotary motion is imparted to the can-body. The can-body, at the end upon which the head is to be placed, is provided with a horizontal outwardly-extending flange D$^2$, and the cap or head near its outer edge is flat upon both faces, as shown at D$^3$, which flattened surfaces when the cover or cap is placed upon the body are brought immediately over the flange D$^2$, and the peripheral surface of the cap or cover is bent downwardly and outwardly to extend beyond and practically cover the flange D$^2$ of the body, as best illustrated at D$^4$ in Fig. 14. Before the can cap or cover is placed upon the body a packing-ring D$^5$, of rubber or equivalent material, is placed between the body-flange D$^2$ and the straight or flat surface D$^3$ of the cap or cover. The handle of the arm or tool is now carried to the front by the operator, the said tool having been adjusted so that the forward edge may contact with the periphery of the cap or cover of the can, and the seam is formed at the one movement of the tool as the several forming-rollers are made to successively engage with the seam. When the first roller 69 contacts with the periphery of the can-cover, the downwardly-extending peripheral portion of the cover is curved under to a contact with the under portion of the body-flange D$^2$, as shown in Fig. 16. This is effected by reason of the concave shape of the channel 72 in this particular roller. When the partially-formed seam is engaged by the inclined central roller 70, the peculiar shape of its peripheral groove causes the flange of the body and that portion of the cap or cover immediately above it to assume the downwardly-inclined position illustrated in Fig. 18, and when the third roller 71 comes in contact with the seam, the said seam is completed as the inner surface of the folded material is carried to a firm and positive contact with the outer surface of the can-body, as shown in Fig. 20, and the packing D$^5$ is securely bound between the folds of the seam. Thus it will be observed the cap or cover of the can is conveniently and expeditiously secured to the body without the use of solder or equivalent material.

The supporting-disk and clamping-disk may be removed at any time and larger or smaller disks put in their places to accommodate different sizes of cans, and the faces of the disks that contact with the can caps or covers may be shaped to correspond to the shape of said covers.

Having thus described my invention, I claim as new and desire to secure by Letters Patent—

1. In a can-capping machine, the combination, with a vertical rest-bar carrying a can-supporting disk, of a weighted lever connected to the rest-bar and mounted on an adjustable fulcrum, substantially as described.

2. In a can-capping machine, the combination, with a vertically-movable rest-bar carrying a can-supporting disk, of a vertical stationary screw, a sleeve mounted on the screw, and a weighted lever pivoted to the sleeve and having one end detachably connected to the rest-arm, substantially as and for the purpose set forth.

3. In a can-capping machine, the combination, with a supporting-table provided with a dovetail rib, of a post provided with a dovetail recess of greater width than the width of the rib, a wedge-key secured to the post in the recess thereof, and a set-screw for adjusting the key to and from the said rib, substantially as and for the purpose specified.

4. In a can-capping machine, the combination, with a post having a socket in its upper end, and a transverse opening below the socket, of a pivot-stud projecting into the socket of the post, a wedge in the said opening for adjusting the pivot-stud, and a shaping-arm carrying forming-rollers pivoted on the said stud, substantially as herein shown and described.

FERNAND SAUNIER.

Witnesses:
GUINOT,
MOREGNO.